US006800583B2

(12) United States Patent
Grosch et al.

(10) Patent No.: US 6,800,583 B2
(45) Date of Patent: Oct. 5, 2004

(54) SUSPENSION OF MULTIMETAL CYANIDE COMPOUNDS, THEIR PREPARATION AND THEIR USE

(75) Inventors: Georg Heinrich Grosch, Bad Dürkheim (DE); Kathrin Harre, Dresden (DE); Jörg Erbes, Karlsruhe (DE); Reinhard Lorenz, Limburgerhof (DE); Stephan Bauer, Hochdorf-Assenheim (DE); Thomas Ostrowski, Castrop-Rauxel (DE); Eva Baum, Schwarzheide (DE); Dieter Junge, Frankenthal (DE); Edward Michael Dexheimer, Grosse Ile, MI (US)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/324,271

(22) Filed: Jun. 2, 1999

(65) Prior Publication Data

US 2002/0006864 A1 Jan. 17, 2002

(51) Int. Cl.$^7$ ................................................ B01J 27/26
(52) U.S. Cl. ....................... 502/175; 502/200; 502/161; 502/162; 502/168; 502/159; 502/172; 423/364; 423/367; 423/371; 423/384; 423/414
(58) Field of Search ................................ 502/175, 200, 502/161, 162, 168, 159, 172; 423/364, 367, 371, 384, 414

(56) References Cited

U.S. PATENT DOCUMENTS

| | | | |
|---|---|---|---|
| 3,278,457 A | * 10/1966 | Milgrom | ................. 568/606 |
| 3,278,458 A | 10/1966 | Belner | |
| 3,278,459 A | 10/1966 | Herold | |
| 3,404,109 A | 10/1968 | Milgrom | |
| 3,427,256 A | 2/1969 | Milgrom | |
| 3,427,334 A | 2/1969 | Belner | |
| 3,829,505 A | 8/1974 | Herold | |
| 3,941,849 A | 3/1976 | Herold | |
| 4,472,560 A | 9/1984 | Kuyper et al. | |
| 4,477,589 A | 10/1984 | van der Hulst et al. | |
| 4,843,054 A | 6/1989 | Harper | |
| 4,877,906 A | 10/1989 | Harper | |
| 5,158,922 A | * 10/1992 | Hinney et al. | ............... 502/175 |
| 5,426,081 A | 6/1995 | Le-Khac | |
| 5,470,813 A | 11/1995 | Le-Khac | |
| 5,482,908 A | 1/1996 | Le-Khac | |
| 5,498,583 A | 3/1996 | Le-Khac | |
| 5,523,386 A | 6/1996 | Le-Khac | |
| 5,525,565 A | 6/1996 | Le-Khac | |
| 5,545,601 A | 8/1996 | Le-Khac | |
| 5,639,705 A | 6/1997 | Bowman et al. | |
| 5,652,329 A | * 7/1997 | Le-Khac | ..................... 528/415 |
| 5,714,639 A | 2/1998 | Bowman et al. | |
| 6,018,017 A | * 1/2000 | Le-Khac | ..................... 528/421 |
| 6,323,375 B1 | 11/2001 | Hofmann et al. | |

FOREIGN PATENT DOCUMENTS

| | | |
|---|---|---|
| DE | 148957 | 6/1981 |
| DE | 203734 | 11/1983 |
| DE | 203735 | 11/1983 |
| EP | 268922 | 6/1988 |
| EP | 283148 | 9/1988 |
| EP | 385619 | 9/1990 |
| EP | 654302 | 5/1995 |
| EP | 659798 | 6/1995 |
| EP | 665254 | 8/1995 |
| EP | 700949 | 3/1996 |
| EP | 743093 | 11/1996 |
| EP | 755716 | 1/1997 |
| EP | 0 761 708 A2 | 3/1997 |
| EP | 862947 | 9/1998 |
| JP | 4351632 A * | 12/1992 |
| WO | WO 97/40086 | 10/1997 |
| WO | WO 98/16310 | 4/1998 |
| WO | WO 99/19063 | 4/1999 |

OTHER PUBLICATIONS

PCT Search Report dated Oct. 11, 2000.
PCT International Search Report, 7 pages, Dec. 2001.

* cited by examiner

Primary Examiner—Elizabeth D. Wood
(74) Attorney, Agent, or Firm—Fernando A. Borrego; Howard & Howard Attys

(57) ABSTRACT

Catalyst suspensions for the ring-opening polymerization of alkylene oxides comprise
a) at least one multimetal cyanide compound having a crystalline structure and a content of platelet-shaped particles of at least 30% by weight, based on the multimetal cyanide compound, and
b) at least one organic complexing agent
c) water and/or
d) at least one polyether and/or
e) at least one surface-active substance, with the proviso that at least component a) and at least two of the components b) to e) have to be present.

13 Claims, No Drawings

SUSPENSION OF MULTIMETAL CYANIDE COMPOUNDS, THEIR PREPARATION AND THEIR USE

The present invention relates to suspensions of multimetal Cyanide compounds, their preparation and their use.

Polyether alcohols are used in large quantities for producing polyurethanes. They are usually prepared by catalytic addition of lower alkylene oxides, in particular ethylene oxide and propylene oxide, onto H-functional initiator substances. Catalysts used are usually basic metal hydroxides or salts, with potassium hydroxide having the greatest industrial importance.

In the synthesis of polyether alcohols having long chains, as are used, in particular, for producing flexible polyurethane foams, secondary reactions occur as chain growth progresses, leading to faults in the chain structure. These by-products are referred to as unsaturated consituents and adversely affect the properties of the resulting polyurethanes. There has therefore been no lack of attempts in the past to prepare polyether alcohols having a low content of unsaturated constituents. In particular, the alkoxylation catalysts used have been changed in a targeted way in an attempt to achieve this. Thus, EP-A-268 922 proposes using cesium hydroxide as catalyst. Although this does succeed in lowering the content of unsaturated constituents, cesium hydroxide is expensive and disposing of it is problematical.

Furthermore, the use of multimetal cyanide complexes, usually zinc hexacyanometalates, for preparing polyether alcohols having a low content of unsaturated constituents is known. There is a large number of documents in which the preparation of polyether alcohols using multimetal cyanide complexes as catalysts is described. Thus, DD-A-203 735 and DD-A-203 734 describe the preparation of polyetherols using zinc hexacyanocobaltate.

The preparation of the zinc hexacyanometalates is also known. These catalysts are usually prepared by reacting solutions of metal salts such as zinc chloride with solutions of alkali metal or alkaline earth metal cyanometalates such as potassium hexacyanocobaltate. A water-miscible, heteroatom-containing component is generally added to the resulting suspension immediately after the precipitation procedure. This component can also be present in one or both of the starting solutions. This water-miscible, heteroatom-containing component can be, for example, an ether, polyether, alcohol, ketone or a mixture thereof. Such processes are described, for example, in U.S. Pat. No. 3,278, 457, U.S. Pat. No. 3,278,458, U.S. Pat. No. 3,278,459, U.S. Pat. No. 3,427,256, U.S. Pat. No. 3,427,334, U.S. Pat. No. 3,404,109, U.S. 3,829,505, U.S. Pat. No. 3,941,849, EP 283,148, EP 385,619, EP 654,302, EP 659,798, EP 665,254, EP 743,093, EP 755,716, U.S. Pat. No. 4,843,054, U.S. Pat. No. 4,877,906, U.S. Pat. No. 5,158,922, U.S. Pat. No. 5,426,081, U.S. Pat. No. 5,470,813, U.S. Pat. No. 5,482,908, U.S. Pat. No. 5,498,583, U.S. Pat. No. 5,523,386, U.S. Pat. No. 5,525,565, U.S. Pat. No. 5,545,601, JP 7,308,583, JP 6,248,068, JP 4,351,632 and U.S. Pat. No. 5,545,601.

DD-A-148 957 describes the preparation of zinc hexacyanoiridate and its use as catalyst in the preparation of polyether alcohols. Here, hexacyanoiridic acid is used as one starting material. This acid is isolated as a solid and is used in this form.

EP 862 947 describes the preparation of double metal cyanide complexes using hexacyanometalic acids, in particular hexacyanocobaltic acid, or their aqueous solutions as starting material. The double metal cyanides produced as described in EP 862 947 have a high reactivity in respect of the ring-opening polymerization of alkylene oxides.

Although multimetal cyanide catalysts have high polymerization activities, there has been no lack of attempts to achieve a further increase in the catalytic activity of the multimetal cyanide compounds. A major focus of work in this area is directed at multimetal cyanide compounds which are amorphous. The preparation of such multimetal cyanide compounds is disclosed, inter alia, in EP 654,302. However, it has been able to be shown that the activity of these catalysts can be increased further by the incorporation of polymers. Thus, EP 700,949 describes double metal cyanide complexes having an increased reactivity and containing from 5 to 80 percent by weight, based on the catalyst, of polyethers having a molar mass of greater than 500 dalton. WO 97/40,086 describes double metal cyanide catalysts having an increased reactivity and containing from 5 to 80% by weight of polyethers having molar masses of less than 500 dalton. WO 98/16310 discloses double metal cyanides which contain from 2 to 80% by weight of functionalized polymers, but no polyethers. The double metal cyanide catalysts disclosed in EP-A-700,949, WO-A-97/40,086 and WO-A-98/16,310 are generally amorphous. According to WO 98/16,310 (page 2, lines 16–22), the best double metal cyanide catalysts known at present have a low degree of crystallinity. The preferred catalysts are essentially noncrystalline (page 3, lines 10–11).

Multimetal cyanide catalysts are usually used in the form of powder for preparing polyether alcohols. U.S. Pat. Nos. 4,477,589 and 4,472,560 describe suspensions of multimetal cyanide compounds in propoxylated glycerol having contents of multimetal cyanide compound of less than 5% by weight. U.S. Pat. Nos. 5,639,705 and 5,714,639 describe catalysts in the form of pastes which comprise from 10 to 60% by weight of multimetal cyanide compound, from 40 to 90% by weight of an organic complexing agent and from 1 to 20% by weight of water.

It is an object of the present invention to use crystalline multimetal cyanide compounds in a form which gives them a very high catalytic activity.

We have found that this object is achieved by suspending crystalline multimetal cyanide compounds in organic or inorganic liquids and using them as catalysts in this form. It is particularly advantageous for the suspended multimetal cyanide compound to have a platelet-like morphology.

The present invention accordingly provides a catalyst suspension for the ring-opening polymerization of alkylene oxides, comprising
a) at least one multimetal cyanide compound having a crystalline structure and a content of platelet-shaped particles of at least 30% by weight, based on the multimetal cyanide compound, and
b) at least one organic complexing agent
c) water and/or
d) at least one polyether and/or
e) at least one surface-active substance, with the proviso that at least component a) and at least two of the components b) to e) have to be present.

The organic complexing agent b) is selected, in particular, from the group consisting of alcohols, ethers, esters, ketones, aldehydes, carboxylic acids, amides, nitrites, sulfides and mixtures thereof.

As polyethers d), use is made, in particular, of polyether alcohols, preferably hydroxyl-containing polyaddition products of ethylene oxide, propylene oxide, butylene oxide, vinyloxirane, tetrahydrofuran, 1,1,2-trimethylethylene oxide, 1,1,2,2-tetramethylethylene oxide, 2,2-dimethyloxetane, diisobutylene oxide, α-methylstyrene oxide and mixtures thereof.

As surface-active substances e), use is made, in particular, of compounds selected from the group consisting of $C_4$–$C_{60}$-alcohol alkoxylates, block copolymers of alkylene oxides of differing hydrophilicity, alkoxylates of fatty acids and fatty acid glycerides, block copolymers of alkylene oxides and polymerizable acids and esters.

The crystalline multimetal cyanide compounds used according to the present invention are preferably prepared by the following method:

a) Addition of an aqueous solution of a water-soluble metal salt of the formula $M^1_m(X)_n$, where $M^1$ is at least one metal ion selected from the group consisting of $Zn^{2+}$, $Fe^{2+}$, $Co^{3+}$, $Ni^{2+}$, $Mn^{2+}$, $Co^{2+}$, $Sn^{2+}$, $Pb^{2+}$, $Fe^{3+}$, $Mo^{4+}$, $Mo^{6+}$, $Al^{3+}$, $V^{5+}$, $Sr^{2+}$, $W^{4+}$, $W^{6+}$, $Cu^{2+}$, $Cr^{2+}$, $Cr^{3+}$, $Cd^{2+}$, $Hg^{2+}$, $Pd^{2+}$, $Pt^{2+}$, $V^{2+}$, $Mg^{2+}$, $Ca^{2+}$, $Ba^{2+}$ and mixtures thereof, X is at least one anion selected from the group consisting of halide, hydroxide, sulfate, carbonate, cyanide, thiocyanate, isocyanate, carboxylate, in particular formate, acetate, propionate or oxalate, and nitrate and m and n are integers which satisfy the valences of $M^1$ and X, to an aqueous solution of a cyanometalate compound of the formula $H_aM^2(CN)_b(A)_c$, where $M^2$ is at least one metal ion selected from the group consisting of $Fe^{2+}$, $Fe^{3+}$, $Co^{3+}$, $Cr^{3+}$, $Mn^{2+}$, $Mn^{3+}$, $Rh^{3+}$, $Ru^{2+}$, $Ru^{3+}$, $V^{4+}$, $V^{5+}$, $Co^{2+}$, $Ir^{3+}$ and $Cr^{2+}$ and $M^2$ can be identical to or different from $M^1$, H is hydrogen or a metal ion, usually an alkali metal ion, an alkaline earth metal ion or an ammonium ion, A is at least one anion selected from the group consisting of halide, hydroxide, sulfate, carbonate, cyanate, thiocyanide, isocyanate, carboxylate and nitrate, in particular cyanide, where A can be identical to or different from X, and a, b and c are integers selected so that the cyanide compound is electrically neutral, where one or both solutions may, if desired, comprise at least one water-miscible, heteroatom-containing ligand selected from the group consisting of alchols, ethers, esters, ketones, aldehydes, carboxylic acids, amides, sulfides or mixtures of at least two of the compounds mentioned, and at least one of the two solutions comprises a surface-active substance, b) if desired, combination of the aqueous suspension formed in step a) with a water-miscible, heteroatom-containing ligand selected from the above-described group which can be identical to or different from the ligand in step a), c) if desired, separation of the multimetal cyanide compound from the suspension.

The platelet-like multimetal cyanide compounds used according to the present invention are crystalline and can have a cubic, tetragonal, trigonal, orthorhombic, hexagonal, monoclinic or triclinic crystal structure. The definition of the crystal systems describing these structures and the space groups belonging to the abovementioned crystal systems may be found in "International tables for crystallography", Volume A, editor: Theo Hahn, (1995).

For the preparation of multimetal cyanide compounds which are used for the suspensions of the present invention, it is advantageous, but not necessary, to use the cyanometalic acid as cyanometalate compound, since this does not result in unavoidable formation of a salt as by-product.

These cyanometalic acids (hydrogen cyanometalates) which are preferably used are stable and readily handleable in aqueous solution. They can be prepared, for example as described in W. Klemm, W. Brandt, R. Hoppe, Z. Anorg. Allg. Chem. 308, 179 (1961), starting from the alkali metal cyanometalate via the silver cyanometalate and then to the cyanometalic acid. A further possibility is to convert an alkali metal or alkaline earth metal cyanometalate into a cyanometalic acid by means of an acid ion exchanger, as described, for example, in F. Hein, H. Lilie, Z. Anorg. Allg. Chem. 270, 45 (1952), or A. Ludi, H. U. Güdel, V. Dvorak, Helv. Chim. Acta 50, 2035 (1967). Further possible ways of synthesizing the cyanometalic acids may be found, for example, in "Handbuch der Präparativen Anorganischen Chemie", G. Bauer (editor), Ferdinand Enke Verlag, Stuttgart, 1981. For an industrial preparation of these compounds, as is necessary for the process of the present invention, the synthesis via ion exchangers is the most advantageous route. After they have been synthesized, the cyanometalic acid solutions can be processed further immediately, but it is also possible to store them for a relatively long period. Such storage should be carried out in the absence of light to prevent decomposition of the acid.

The proportion of the acid in the solution should be greater than 80% by weight, based on the total mass of cyanometalate complexes, preferably greater than 90% by weight, in particular greater than 95% by weight.

As heteroatom-containing ligands, use is made of the above-described organic substances. In a preferred embodiment of the preparation process, no heteroatom-containing ligand is added to the solutions in step a) and the addition of heteroatom-containing ligand to the suspension of precipitate is also omitted in step b). Only at least one surface-active compound is added, as mentioned above, to one or both of the solutions in step a).

The surface-active compounds used according to the present invention can be anionic, cationic, nonionic and/or polymeric surfactants.

In particular, nonionic and/or polymeric surfactants are used. Compounds selected from this group are, in particular, fatty alcohol alkoxylates, block copolymers of various epoxides having differing hydrophilicity, castor oil alkoxylates or block copolymers of epoxides and other monomers, e.g. acrylic acid or methacrylic acid.

Fatty alcohol alkoxylates used according to the present invention have a fatty alcohol comprising 8–36 carbon atoms, in particular 10–18 carbon atoms. This is alkoxylated with ethylene oxide, propylene oxide and/or butylene oxide. The polyether part of the fatty alcohol alkoxylate used according to the present invention can consist of pure ethylene oxide, propylene oxide or butylene oxide polyethers. Furthermore, it is also possible to use copolymers of two or three different alkylene oxides or else block copolymers of two or three different alkylene oxides. Fatty alcohol alkoxylates which have pure polyether chains are, for example, Lutensol AO grades from BASF AG. Fatty alcohol alkoxylates having block copolymers as polyether part are Plurafac LF grades from BASF Aktiengesellschaft. The polyether chains particularly preferably consist of from 2 to 50, in particular from 3 to 15, alkylene oxide units.

Block copolymers as surfactants comprise two different polyether blocks which differ in their hydrophilicity. Block copolymers which can be used according to the present invention may comprise ethylene oxide and propylene oxide (Pluronic grades, BASF Aktiengesellschaft). The water solubility is controlled via the lengths of the various blocks. The molar masses are in the range from 500 Da to 20,000 Da, preferably from 1000 Da to 6000 Da and in particular 1500–4000 Da. In the case of ethylene-propylene copolymers, the proportion of ethylene oxide is from 5 to 50% by weight and the proportion of propylene oxide is from 50 to 95% by weight.

Copolymers of alkylene oxide with other monomers which can be used according to the present invention preferably have ethylene oxide blocks. The other monomer can be, for example, butyl methacrylate (PBMA/PEO BE1010/BE1030, Th. Goldschmidt), methyl methacrylate (PMMA/PEO ME1010/ME1030, Th. Goldschmidt) or methacrylic acid (EA-3007, Th. Goldschmidt).

The surface-active substances used should have a moderate to good solubility in water.

To prepare the crystalline multimetal cyanide compounds used according to the present invention, an aqueous solution of a cyanometalic acid or of a cyanometalate salt is combined with the aqueous solution of a metal salt of the formula $M^1_m(X)_n$, where the symbols are as defined above. Here, a stoichiometric excess of the metal salt is employed. The molar ratio of the metal ion to the cyanometalate component is preferably from 1.1 to 7.0, more preferably from 1.2 to 5.0 and particularly preferably from 1.3 to 3.0. It is advantageous to place the metal salt solution in the precipitation vessel first and to add the cyanometalate compound, but the reverse procedure can also be used. During and after combining the starting solutions, good mixing, for example by stirring, is necessary.

The content of the cyanometalate compound in the cyanometalate starting solution based on the mass of cyanometalate starting solution is from 0.1 to 30% by weight, preferably from 0.1 to 20% by weight, in particular from 0.2 to 10% by weight. The content of the metal salt component in the metal salt solution based on the mass of metal salt solution is from 0.1 to 50% by weight, preferably from 0.2 to 40% by weight, in particular from 0.5 to 30% by weight.

The surface-active substances are generally added beforehand to at least one of the two solutions. The surface-active substances are preferably added to the solution which is initially charged in the precipitation. The content of surface-active substances in the precipitation solution based on the total mass of the precipitation suspension is from 0.01 to 40% by weight. Preference is given to a content of from 0.05 to 30% by weight.

A further preferred embodiment provides for the surface-active substances to be divided proportionately among the two starting solutions.

The heteroatom-containing ligands are, in particular, added to the suspension formed after combination of the two starting solutions. Here too, good mixing has to be ensured.

However, it is also possible to add all or some of the ligand to one or both starting solutions. In this case, owing to the change in the salt solubility, the ligand is preferably added to the solution of the cyanometalate compound.

The content of the ligand in the suspension formed after the precipitation should be from 1 to 60% by weight, preferably from 5 to 40% by weight, in particular from 10 to 30% by weight.

The multimetal cyanide compounds used according to the present invention preferably have X-ray diffraction patterns as are shown in FIGS. 3 and 4 of DE 197 42 978.

The multimetal cyanide compounds used for preparing the suspensions of the present invention preferably comprise primary crystals having a platelet-like habit.

For the purposes of the present invention, platelet-shaped particles are particles whose thickness is one third, preferably one fifth, particularly preferably one tenth, of their length and width. The preferred catalyst according to the present invention contains more than 30% by weight of such platelet-shaped crystals, preferably more than 50% by weight, particularly preferably more than 70% by weight and very particularly preferably more than 90% by weight. The preferred multimetal cyanide compounds according to the present invention can be seen in scanning electron micrographs.

Multimetal cyanide compounds which are less preferred according to the present invention are often either in rod form or in the form of small cube-shaped or spherical crystals.

Depending on how pronounced the platelet character of the particles is and how many are present in the catalyst, it is possible that distinct to strong intensity changes in the individual reflections in the X-ray diffraction pattern compared to rod-shaped multimetal cyanide compounds of the same structure will occur.

The multimetal cyanide compounds produced by precipitation according to the above-described process can then be separated from the suspension by filtration or centrifugation. After the separation, the multimetal cyanide compounds can then be washed one or more times. Washing can be carried out using water, the abovementioned heteroatom-containing ligands or mixtures thereof. Washing can be carried out in the separation apparatus (e.g. filtration apparatus) itself or be carried out in separate apparatuses by, for example, resuspension of the multimetal cyanide compound in the washing liquid and separating it from the liquid again. This washing can be carried out at from 10° C. to 150° C., preferably from 15 to 60° C.

The multimetal cyanide compound can subsequently be dried at from 30° C. to 180° C. and pressures of from 0.001 bar to 2 bar, preferably from 30° C. to 100° C. and pressures of from 0.002 bar to 1 bar.

Drying can also be omitted, in which case a moist filter cake is obtained.

A preferred embodiment of the preparation process for the multimetal cyanide compound used according to the present invention provides for no organic, heteroatom-containing ligand, as has been defined above, apart from the surface-active substance to be added before, during or after the precipitation. In this embodiment of the preparation process, in which no further organic, heteroatom-containing ligands apart from the surface-active substance are used, the multimetal cyanide compound is washed with water after separation from the precipitation suspension.

The multimetal cyanide compounds prepared as described above are used in the form of the suspensions of the present invention for preparing polyether alcohols.

Both the moist and the dried multimetal cyanide compounds can be used as starting materials for the suspensions of the present invention.

The pulverulent, dried multimetal cyanide compounds are, to prepare the suspensions of the present invention, dispersed as finely as possible in the suspension liquid by an efficient dispersion procedure in order to achieve a very high activity of the multimetal cyanide catalyst.

Such methods of efficiently producing a very finely dispersed suspension are, inter alia, stirring under high shear forces, e.g. in homogenizers or Ultraturrax apparatuses, and also the use of dispersion machines, in particular ball mills and agitated ball mills, e.g. bead mills in general and particularly those having small milling beads (e.g. 0.3 mm diameter) such as the double-cylinder bead mills (DCP-Super Flow®) from Draiswerken GmbH, Mannheim, or the centrifugal fluidized bed mills from Netzsch Gerätebau GmbH, Selb. If desired, dissolvers can be used for predispersion. Furthermore, small amounts of dispersants known to those skilled in the art, e.g. lecithin, zinc oleate or zinc stearate, can be used. In addition, all methods which allow the powder to be dispersed very finely in liquids are suitable.

Dispersion can be carried out at from 10° C. to 150° C., preferably from 30° C. to 120° C.

Dispersion liquids which can be used are polyethers, organic liquids or water, and also mixtures thereof.

As polyethers, it is possible to use compounds having molar masses of from 150 to 6000 dalton and functionalities of from 1 to 8. Preference is given to using polyethers having molar masses of from 150 to 2000 dalton and functionalities of from 1 to 3, in particular molar masses of from 150 to 800 dalton.

If the predried multimetal cyanide compound is suspended in an organic liquid, suspensions having solids contents of less than 10% by weight are preferred. Particular preference is given to solids contents of less than 5% by weight. Organic liquids which can be used are heteroatom-containing compounds and also hydrocarbons or mixtures thereof. Compounds which have a vapor pressure of greater than 0.005 bar at 100° C.

If the predried multimetal cyanide compound is suspended in water, preference is given to suspensions having solids contents of less than 20% by weight and pastes having solids contents of less than 60% by weight. The water content of the pastes and suspensions should then be above 20% by weight.

Preference is given to omitting the drying step. In this case, the moist multimetal cyanide compounds are used for preparing the suspensions of the present invention.

For this purpose, a suspension is prepared from the moist ultimetal cyanide compound after precipitation and separation of the precipitate from the suspension and after washing of the multimetal cyanide compound, either on the filtration apparatus or externally with filtration being repeated again, but without carrying out a drying step. The multimetal cyanide compound can, as in the case of the dried multimetal cyanide compounds, be suspended in the abovementioned dispersion media. The methods of preparing a very finely divided suspension which have been described for the dried multimetal cyanide compounds can also be used for dispersing the undried multimetal cyanide compounds.

When using moist multimetal cyanide compounds for preparing suspensions in at least one polyether or a similarly high-boiling liquid, heat and vacuum can, in a preferred embodiment, be applied simultaneously during the dispersion step in order to remove volatile constituents such as water or organic ligands. In the present context, application of vacuum means both the normal vacuum stripping at pressures down to 0.001 bar and also the combination of vacuum treatment and stripping with inert gases such as nitrogen, argon, helium, etc. The temperature in this step can be from 10° C. to 150° C., preferably from 30° C. to 120° C.

In the case of multimetal cyanide suspensions in polyethers, suspensions having solids contents of less than 20% by weight are preferred. Particular preference is given to solids contents of less than 10% by weight, in particular less than 5% by weight. If the undried multimetal cyanide compound is suspended in organic liquids, as described above, suspensions having solids contents of less than 10% by weight are preferred. Particular preference is given to solids contents of less than 5% by weight. If the undried multimetal cyanide compound is suspended in water, suspensions having solids contents of less than 20% by weight and pastes having solids contents of less than 60% by weight are preferred. The water content of the pastes and suspensions should then be above 20% by weight.

If the starting materials used for preparing the multimetal cyanide compound are cyanometalic acid and, as metal salt, a salt of an acid which has a vapor pressure of greater than 0.005 bar at 100° C., the suspensions of the present invention can be prepared according to the following advantageous embodiment. Here, the precipitation is carried out in the presence of the surface-active agent and optionally the organic ligand. If an organic ligand is used, the organic ligand should likewise have a vapor pressure of greater than 0.005 bar at 100° C. After combining the starting material solutions, polyether is added to the precipitation suspension and the acid formed during the precipitation, the water and at least part of the organic ligands are distilled off, if desired under reduced pressure. The remaining suspension has, according to the present invention, a solids content of less than 20% by weight and a polyether content of greater than 80% by weight. The possible polyethers are defined above. Preference is given to polyether alcohols having molar masses of from 150 to 2000 dalton, so that the resulting suspension can be used directly as catalyst for preparing polyether alcohols.

The multimetal cyanide suspensions prepared by the method according to the present invention are very useful as catalysts for the synthesis of polyetherols having functionalities of from 1 to 8, preferably from 1 to 6, and molar masses of from 500 to 50,000, preferably from 800 to 15,000, by addition of alkylene oxides onto H-functional initiator substances. The catalyst concentrations employed are less than 1% by weight, preferably less than 0.5% by weight, particularly preferably less than 1000 ppm, very particularly preferably less than 500 ppm and especially preferably less than 100 ppm, based on the total mass of the polyetherol. The polyetherols can be prepared either continuously or batchwise. The synthesis is carried out by a suspension process. The temperatures employed in the synthesis are in the range from 50° C. to 200° C., with preference being given to temperatures in the range from 90° C. to 150° C.

To prepare polyether alcohols using the catalysts of the present invention, it is possible to employ compounds having at least one alkylene oxide group, for example ethylene oxide, 1,2-epoxypropane, 1,2-methyl-2-methylpropane,1,2-epoxybutane, 2,3-epoxybutane, 1,2-methyl-3-methylbutane, 1,2-epoxypentane, 1,2-methyl-3-methylpentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, styrene oxide, 1,2-epoxycyclopentane,1,2-epoxycyclohexane, (2,3-epoxypropyl)benzene, vinyloxirane, 3-phenoxy-1,2-epoxypropane, 2,3-epoxy (methyl ether), 2,3-epoxy(ethyl ether), 2,3-epoxy(isopropyl ether), 2,3-epoxy-1-propanol, 3,4-epoxybutyl stearate, 4,5-epoxypentyl acetate, 2,3-epoxy propyl methacrylate, 2,3-epoxypropyl acrylate, gylcidyl butyrate, methyl glycidate, ethyl 2,3-epoxybutanoate, 4-(trimethylsilyl)butane 1,2-epoxide, 4-(triethylsilyl)butane 1,2-epoxide, 3-(perfluoromethyl)propene oxide, 3-(perfluoroethyl) propene oxide, 3-(perfluorobutyl)propene oxide, 4-(2,3-epoxypropy)morpholine, 1-(oxiran-2-ylmethyl)pyrrolidin-2-one, and also any mixtures of at least two of the abovementioned compounds.

Preference is given to ethylene oxide, 1,2-epoxypropane, 1,2-epoxybutane, styrene oxide, vinyloxirane and any mixtures of these, in particular ethylene oxide, 1,2-epoxypropane and mixtures of ethylene oxide and 1,2-epoxypropane.

The invention is illustrated by the following examples.

EXAMPLES

Preparation of Hexacyanocobaltic Acid 7 l of strong acid ion exchanger in the sodium form (Amberlite® 252 Na, Rohm & Haas) were introduced into an ion exchange column (length: 1 m, volume:7.7 l). The ion exchanger was subsequently converted into the H form by passing 10% strength hydrochloric acid through the ion exchange column for 9 hours at a rate of 2 bed volumes per hour, until the sodium content of the discharged solution was less than 1 ppm. The ion exchanger was subsequently washed with water until neutral. The regenerated ion exchanger was then used to prepare a hexacyanocobaltic acid which was essentially free of alkali metal. For this purpose, a 0.24 molar solution of potassium hexacyanocobaltate in water was passed through the ion exchanger at a rate of 1 bed volume per hour. After 2.5 bed volumes, the feed was changed from potassium hexacyanocobaltate solution to water. The 2.5 bed volumes obtained had an average hexacyanocobaltic acid content of 4.5% by weight and alkali metal contents of less than 1 ppm. The hexacyanocobaltic acid solutions used for the further examples were diluted appropriately with water.

Comparative Example 1

200 ml of an aqueous hexacyanocobaltic acid solution (4.4% by weight of $H_3[Co(CN)_6]$, potassium content <1 ppm) were heated to 40° C. and subsequently admixed while stirring (blade stirrer, rotational speed=500 $min^{-1}$) with a solution of 17.88 g of zinc(II) acetate dihydrate in 60 g of water. Subsequently, 35 g of tert-butanol were added to the suspension. The suspension was stirred for a further 30 minutes at 40° C. The solid was then filtered off with suction and washed on the filter with 200 ml of tert-butanol. The solid which had been treated in this way was dried at 50° C. under reduced pressure for 16 hours. The X-ray diffraction pattern of the double metal cyanide obtained in this way could be indexed as monoclinic; the scanning electron micrographs showed rod-shaped particles.

Comparative Example 2

300 ml of an aqueous hexacyanocobaltic acid solution (2.2% by weight of $H_3[Co(CN)_6]$, potassium content <1 ppm) were heated to 40° C. and while stirring (blade stirrer, rotational speed=500 $min^{-1}$), 15 ml of Pluronic PE 6100 (BASF Aktiengesellschaft, block copolymer of PO and EO) were added and dissolved. Subsequently, a solution of 13.38 g of zinc(II) acetate dihydrate in 50 g of water was added while stirring (blade stirrer, rotational speed=500 $min^{-1}$). 50 g of tert-butanol were subsequently added to the suspension. The suspension was stirred for a further 30 minutes at 40° C. The solid was then filtered off with suction and washed on the filter with 200 ml of tert-butanol. The solid which had been treated in this way was dried at 50° C. under reduced pressure for 16 hours. The X-ray diffraction pattern of the double metal cyanide obtained in this way showed two phases of which one could be indexed as monoclinic and the other could be indexed as cubic; the scanning electron micrographs showed relatively large platelet-shaped particles and traces of small cubic particles.

Comparative Example 3

300 g of an aqueous hexacyanocobaltic acid solution (2.2% by weight of $H_3[Co(CN)_6]$, potassium content <1 ppm) were heated to 40° C. and while stirring (blade stirrer, rotational speed=500 $min^{-1}$), 30 ml of Pluronic PE 6100 (BASF Aktiengesellschaft, block copolymer of PO and EO) were added and dissolved. Subsequently, a solution of 13.38 g of zinc(II) acetate dihydrate in 50 g of water was added while stirring (blade stirrer, rotational speed=500 $min^{-1}$). 50 g of tert-butanol were subsequently added to the suspension. The suspension was stirred for a further 30 minutes at 40° C. The solid was then filtered off with suction and washed on the filter with 200 ml of tert-butanol. The solid which had been treated in this way was dried at 50° C. under reduced pressure for 16 hours. The X-ray diffraction pattern of the double metal cyanide obtained in this way showed two phases of which one could be indexed as monoclinic and the other could be indexed as cubic; the scanning electron micrographs showed relatively large platelet-shaped particles and traces of small cubic particles.

Comparative Example 4

200 g of an aqueous hexacyanocobaltic acid solution (3.7% by weight of $H_3[Co(CN)_6]$, potassium content <1 ppm) were heated to 40° C. and while stirring (blade stirrer, rotational speed=500 $min^{-1}$), 0.5 ml of Plurafac LF 400 (BASF Aktiengesellschaft) was added and dissolved. Subsequently, a solution of 14.9 g of zinc(II) acetate dihydrate in 60 g of water was added while stirring (blade stirrer, rotational speed=500 $min^{-1}$). 35 g of tert-butanol were subsequently added to the suspension. The suspension was stirred for a further 30 minutes at 40° C. The solid was then filtered off with suction and washed on the filter with 200 ml of tert-butanol. The solid which had been treated in this way was dried at 50° C. under reduced pressure for 16 hours. The X-ray diffraction pattern of the double metal cyanide obtained in this way showed one crystalline phase which could be indexed as monoclinic; the scanning electron micrographs showed platelet-shaped particles.

Example 1

300 g of an aqueous hexacyanocobaltic acid solution (2.2% by weight of $H_3[Co(CN)_6]$, potassium content <1 ppm) were heated to 40° C. and while stirring (blade stirrer, rotational speed=500 $min^{-1}$), 10 ml of Pluronic PE 6100 (BASF Aktiengesellschaft) were added and dissolved. A solution of 13.38 g of zinc(II) acetate dihydrate in 50 g of water was subsequently added while stirring (blade stirrer, rotational speed=500 $min^{-1}$). 35 g of dipropylene glycol were subsequently added to the suspension. The suspension was stirred for a further 30 minutes at 40° C. The solid was then filtered off with suction and washed on the filter with 200 ml of dipropylene glycol. The moist solid was treated at 50° C. under reduced pressure for 16 hours and subsequently dispersed while still moist in dipropylene glycol to give a 20% strength suspension.

Example 2

479.3 g of an aqueous zinc acetate solution (13.38 g of zinc acetate dihydrate and 2.2 g of Pluronic® PE 6200 (BASF Aktiengesellschaft) dissolved in 150 g of water) were heated to 50° C. While stirring (screw stirrer, stirring energy input: 1W/l), 558 g of an aqueous hexacyanocobaltic acid solution (cobalt content: 9 g/l, 1.5% by weight of Pluronic® PE 6200 (BASF Aktiengesellschaft), based on the hexacyanocobaltic acid solution) were then metered in over a period of 20 minutes. After all the hexacyanocobaltic acid solution had been metered in, the mixture was stirred for a further 5 minutes at 50° C. The temperature was subsequently reduced to 40° C. over a period of one hour. The precipitated solid was separated from the liquid by means of a pressure filter and washed with water. The moist filter cake was subsequently dispersed in the amount of water required to give a 5% strength by weight multimetal cyanide suspension.

Example 3

The synthesis was carried out in a cleaned and dried 1 l stirring autoclave. 150 g of polypropylene glycol were placed in the stirring autoclave and admixed with 80 ppm of multimetal cyanide catalyst from Example 2 (content of solid multimetal cyanide compound, based on the mass of final product). The contents of the reactor were made inert with nitrogen and treated at 127° C. under reduced pressure for 1.25 hours.

Subsequently, 1 mol of propylene oxide was metered in at 130° C. and the start of the reaction was awaited. Subsequently, the remaining propylene oxide up to a total amount of 620 g was metered in. The addition time was 3 hours and the pressure maximum was 4 bar absolute. The product was worked up by vacuum distillation and filtration.
Hydroxyl number: 57 mg KOH/g;
Viscosity at 25° C.: 320 mPas;
Zn/Co content: 4.1/<1 ppm.

Comparative Example 5

The synthesis was carried out in a cleaned and dried 1 l stirring autoclave. 200 g of polypropylene glycol were placed in the stirring autoclave and admixed with 250 ppm of catalyst from Comparative Example 1. The contents of the reactor were made inert with nitrogen and treated at 108° C. under reduced pressure for 1 hour.

1 mol of propylene oxide was subsequently metered in at 115° C. and the start of the reaction was awaited. Subsequently, the remaining propylene oxide up to a total amount of 800 g was metered in. The addition time was 1.1 hours and the pressure maximum was 3.9 bar absolute. The product was worked up by vacuum distillation and filtration.
Hydroxyl number: 52 mg KOH/g;
Viscosity at 25° C.: 516 mPas;
Zn/Co content: 62/25 ppm.

Example 4

The synthesis was carried out in a cleaned and dried 1 l stirring autoclave. 200 g of polypropylene glycol were placed in the stirring autoclave and admixed with 100 ppm of catalyst from Example 1. The contents of the reactor were made inert with nitrogen and treated at 105° C. under reduced pressure for 1 hour. 1 mol of propylene oxide was subsequently metered in at 110° C. and the start of the reaction was awaited. Subsequently, the remaining propylene oxide up to a total amount of 800 g was metered in. The addition time was 1.6 hours and the pressure maximum was 4.2 bar absolute. The product was worked up by vacuum distillation and filtration.
Hydroxyl number: 53 mg KOH/g;
Viscosity at 25° C.: 571 mPas;
Zn/Co content: 2.7/<2 ppm.

Comparative Example 6

The synthesis was carried out in a cleaned and dried 1 l stirring autoclave. 200 g of polypropylene glycol were placed in the stirring autoclave and admixed with 125 ppm of catalyst from Comparative Example 3. The contents of the reactor were made inert with nitrogen and treated at 105° C. under reduced pressure for 1 hour.

1 mol of propylene oxide was subsequently metered in at 115° C. and the start of the reaction was awaited. Subsequently, the remaining propylene oxide up to a total amount of 800 g was metered in. The addition time was 0.75 hour and the pressure maximum was 4.1 bar absolute. The product was worked up by vacuum distillation and filtration.
Hydroxyl number: 56 mg KOH/g;
Viscosity at 25° C.: 470 mPas;
Zn/Co content: 6.5/2.2 ppm.

Comparative Example 7

The synthesis was carried out in a cleaned and dried 1 l stirring autoclave. 200 g of polypropylene glycol were placed in the stirring autoclave and admixed with 125 ppm of catalyst from Comparative Example 3. The contents of the reactor were made inert with nitrogen and treated at 105° C. under reduced pressure for 1 hour.

1 mol of propylene oxide was subsequently metered in at 115° C. and the start of the reaction was awaited. Subsequently, the remaining propylene oxide up to a total amount of 800 g was metered in. The addition time was 1 hour and the pressure maximum was 4.6 bar absolute. The product was worked up by vacuum distillation and filtration.
Hydroxyl number: 53 mg KOH/g;
Viscosity at 25° C.: 337 mPas;
Zn/Co content: 14/5.2 ppm.

We claim:

1. A catalyst suspension for the ring-opening polymerization of alkylene oxides, comprising
   a) at least one multimetal cyanide compound having a crystalline structure and a content of platelet-shaped particles of at least 30% by weight, based on the multimetal cyanide compound, and/or
   b) at least one organic complexing agent
   c) water and/or
   d) at least one polyether and
   e) at least one surface-active substance, with the proviso that at least components a) d), and e) and at least one of the components b) and c) have to be present, wherein d), and e) are not the same components.

2. A catalyst suspension as claimed in claim 1, wherein at least one of the multimetal cyanide compounds a) has a cubic crystal structure.

3. A catalyst suspensions claimed in claim 1, wherein at least one of the multimetal cyanide compounds a) has a tetragonal crystal structure.

4. A catalyst suspension as claimed in claim 1, wherein at least one of the multimetal cyanide compounds a) has an orthorhombic crystal structure.

5. A catalyst suspension as claimed in claim 1, wherein at least one of the multimetal cyanide compounds a) has a hexagonal crystal structure.

6. A catalyst suspension as claimed in claim 1, wherein at least one of the multimetal cyanide compounds a) has a trigonal crystal structure.

7. A catalyst suspension as claimed in claim 1, wherein at least one of the multimetal cyanide compounds a) has a monoclinic crystal structure.

8. A catalyst suspension as claimed in claim 1, wherein at least one of the multimetal cyanide compounds a) base triclinic crystal structure.

9. A catalyst suspension as claimed in claim 1, wherein the organic complexing agent b) is selected from the group consisting of alcohols, ethers, esters, ketones, aldehydes, carboxylic acids, amides, nitriles, sulfides and mixtures thereof.

10. A catalyst suspension as claimed in claim 1, wherein the polyether d) is a polyether alcohol.

11. A catalyst suspension as claimed in claim 1 or 9, wherein the polyether alcohols are selected from the group consisting of hydroxyl-containing polyaddition products of ethylene oxide, propylene oxide, butylene oxide, vinyloxirane, tetrahydrofuran, 1,1,2-trimethylene oxide, diisobutylene oxide, α-methylstyrene oxide, and mixtures thereof.

12. A catalyst suspension as claimed in claim 1, wherein the surface-active substances e) are selected from the group consisting of $C_4$–$C_{60}$-alcohol alkoxylates, block copolymers of alkylene oxides of differing hydrophilicity, alkoxylates of (any acids and fatty acid glycerides, block copolymers of alkylene oxides and polymerizable acids and esters.

13. A catalyst suspension as claimed in claim 1, wherein said content of said platelet-shaped particles includes primary particles having a length and a width that are at least three times greater than a thickness said primary particles.

* * * * *